United States Patent [19]
Meekhof, Sr. et al.

[11] Patent Number: 4,991,901
[45] Date of Patent: Feb. 12, 1991

[54] TRUCK BODY COVER

[76] Inventors: David H. Meekhof, Sr., 4186 Burton, SW., Walker, Mich. 59504; David H. Meekhof, Jr., 4360 Fairview, Grandville, Mich. 49418

[21] Appl. No.: 399,606
[22] Filed: Aug. 28, 1989
[51] Int. Cl.⁵ ............................................. B60J 11/00
[52] U.S. Cl. ..................................... 296/98; 220/211
[58] Field of Search .................. 296/98, 100; 220/200, 220/211, 262

[56] References Cited
U.S. PATENT DOCUMENTS

| | | | |
|---|---|---|---|
| 3,759,568 | 9/1973 | Unruh | 296/98 |
| 4,341,416 | 7/1982 | Richard | 296/98 |
| 4,380,350 | 4/1983 | Block | 296/98 |
| 4,529,098 | 7/1985 | Heider et al. | 296/98 |
| 4,673,208 | 6/1987 | Tsukamoto | 296/98 |

Primary Examiner—Robert R. Song
Attorney, Agent, or Firm—Price, Heneveld, Cooper, DeWitt & Litton

[57] ABSTRACT

A power driven flexible cover for an open truck body. The cover is supported on a roller which moves from one side of the truck body to the other to open and close the cover over the open body. A motor and gear reduction train is used to move the roller. The roller is restrained at each end by a spring-biased cable which causes the roller to move in a substantially straight path from one side of the truck body to the other.

15 Claims, 5 Drawing Sheets

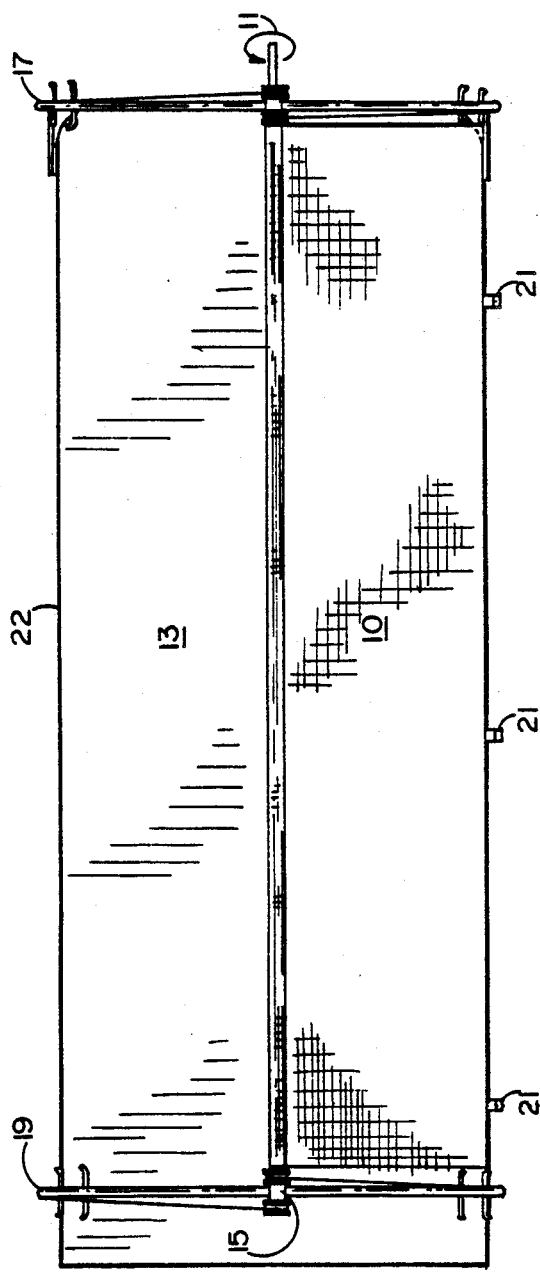
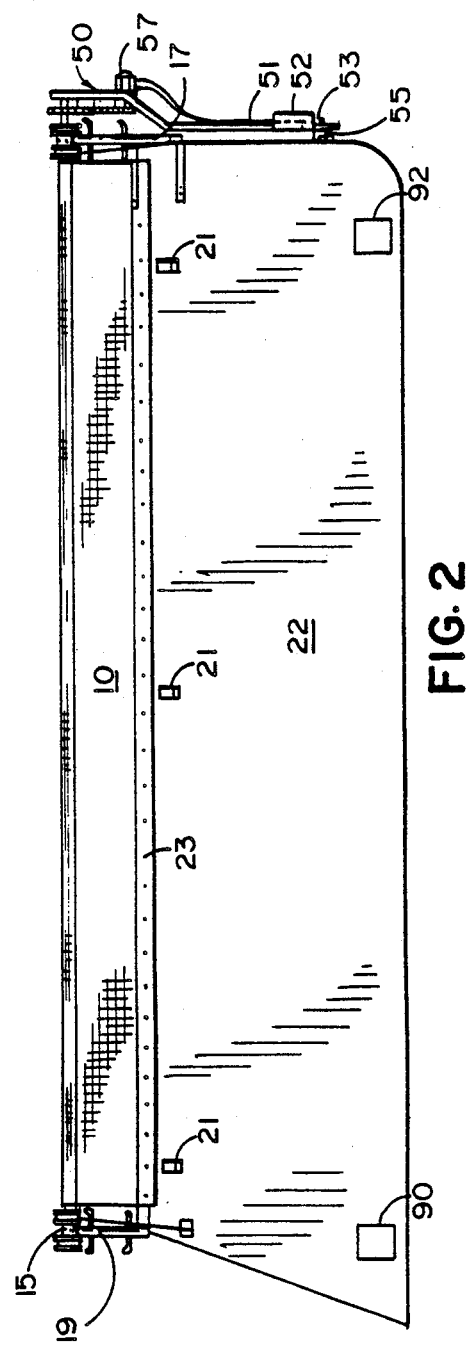
FIG. 1
FIG. 2

TRUCK BODY COVER

BACKGROUND OF THE INVENTION

The present invention relates to a cover for an open-body truck and particularly to a power-driven cover for such a truck.

Many states have now passed legislation requiring that the load be covered in open-body trucks and trailers. This is particularly important when a loose material is being carried by the truck which can be blown from the truck damaging oncoming and following automobiles as well as littering the highway.

In order to comply with the legislation, several different schemes have been developed for covering the truck loads. In one technique, a long piece of tubular material is extended from the front of the truck body to the rear. The cover is fastened to the tube and to one side of the truck. At one end of the tube, a large hand wheel is provided for rotating the tube and in turn unrolling the cover over the load. The tube rides along the top of the front and rear edges of the body and is rolled from side to side. The end of the tube remote from the hand wheel has a cable attached to a spring-bias means to assist in moving the remote end of the tube. While this device does indeed cover the open body of the truck, it does not work well with end dump trailers that have a tailgate. Also, it requires manual labor which can amount to enough time in many cases that the truck rates are affected substantially. Also, it is dangerous to have employees climbing up and down the trailer as many as 40 times per day to operate the cover. Also, since the tube rides along the front and rear edges of the truck body, any portion of the load extending above the edge has to be leveled by the truck driver before the cover can be put in place. The driver is not only placed at risk in climbing into and out of the truck but also in moving the load particularly if it is debris, for example, from the demolition of a building where broken glass, nails, and sheet metal expose the driver to the threat of severe physical injury.

In another attempt to contain the load in an open-body truck, a large U-shaped frame has been mounted so that it can pivot from a point centrally located near the bottom of the body of the truck midway between the front and rear. When the driver wishes to cover the load, he moves the frame causing the leading edge to rise high in the air over the load and then down to the rear of the open body. While this technique does protect the driver from having to climb into the body of the truck and level the load, it is subject to severe wind damage. It is now common practice when this technique is used to use an open mesh for the cover to allow the wind to freely pass through the cover. While this lessens the wind damage problem, it raises the problem of the load escaping through the mesh. The load can also escape over the trailer sides since the cover is attached to the front and rear of the body and does nothing to contain the sides.

In an attempt to solve the problem of the cover flapping in the wind and being subjected to tearing, another technique uses an accordion-type cover in which a cable supports the cover and guides it along each edge of the truck as the cover is pulled from the front of the truck body to the rear. While this technique does stiffen the center of the cover, it has been found that the entire cover is subject to being blown off the body due to the wind, therefore, also requiring an open mesh. Also, the cable on each side of the truck body is subject to damage by loading equipment. If the cable becomes damaged, the cover cannot be moved.

Each of the aforementioned techniques is found in common use on the highways today. As mentioned, each of these techniques is also subject to wind damage requiring the use of a mesh cover and those that require the cover to ride along the top edge of the open truck body present the problem of the driver having to move or level the load before the cover can be put in place.

SUMMARY OF THE INVENTION

In accordance with the present invention, a power-driven side to side cover is provided for open-body dump trucks and trailers. The movement of the cover is controlled by the truck driver while standing safely on the ground. As the cover moves into place, the leading edge passes up, over, and then down over the load so that it is not blocked by any material standing above the top surface of the truck body, and also clears the tailgate hinges and hinge blocks on the rear of the body. The power-driven cover for the open-truck body is held tightly in place against the top edge of the truck body so that it is protected from wind damage thus enabling the use of a solid watertight cover material.

BRIEF DESCRIPTION OF THE DRAWINGS

FIG. 1 is a top plan view showing a cover partially covering the open body of a dump trailer body;

FIG. 2 is a side elevational view showing the cover fastened to the side of the truck body;

DESCRIPTION OF THE PREFERRED EMBODIMENT

Figure 3:
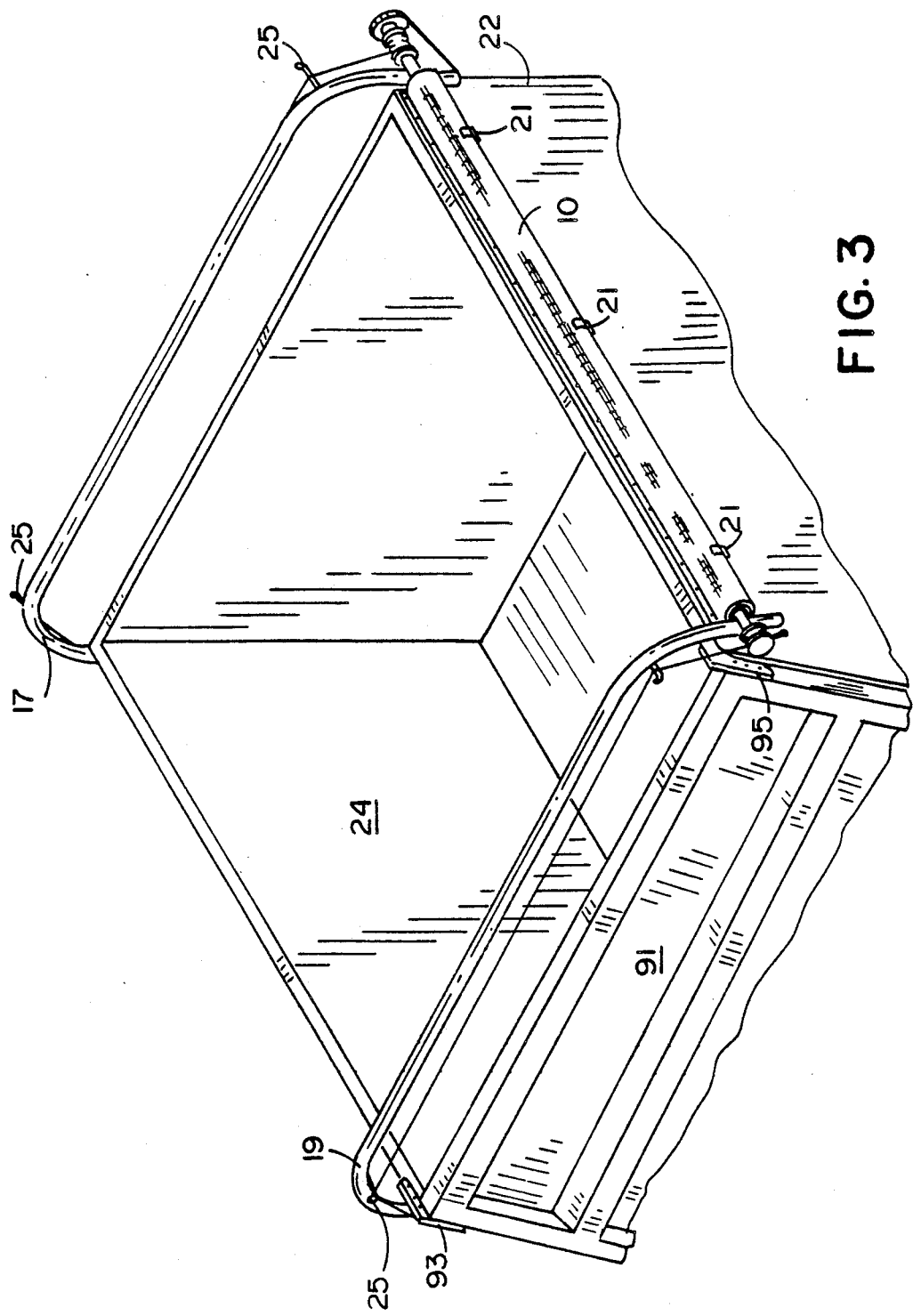
FIG. 3 is a perspective view from the rear showing the cover opened.

Referring to FIG. 1, a cover 10 is shown being rolled, as indicated by the directional arrow 11, across the open body of a dump trailer 13. The cover 10 is wrapped about a roller 15 which rides along a support 17 at the front of the open trailer and a support 19 at the rear of the trailer. The roller 15, in the preferred embodiment, is a hollow steel tube or pipe, the diameter of which is related to the width of the truck and the number of revolutions necessary to cover and uncover the body. The wall thickness of the tube is related to the weight of the cover. A tube or pipe 2 inches in diameter has been found suitable for many applications and is preferred for standard truck bodies. The length of the tube or pipe is related to the length of the truck body. The tube or pipe should be strong enough to support itself and the cover.

As shown in FIG. 3, when the cover is completely rolled back, it is supported along the side of the truck body by spaced hooks 21. The hooks carry the combined weight of the roller 15 and the rolled cover 10. The cover 10 is preferably made of canvas or a canvas-like material of a normally relatively tight weave. The cover can be made of natural or synthetic fibers. The cover can also be made of plastic film of sufficient thickness to withstand the abuse it will receive in service. In some applications, it may be preferred to use an open mesh cover and the present invention is meant to include all type materials.

An edge of the cover extending substantially the full length of the body of the truck is fastened to the side of the truck by suitable means such as screws, bolts, rivets, or straps. The edge of the cover can also be reinforced with a suitable metal or wooden batten if desired. As shown in FIG. 2, the roller 15 rides up and over the supports 17 and 19. It then drops down below the edge of the truck on the opposite side. By having the edge of the cover carried up and over the load in this manner, it becomes unnecessary for the driver to level the load before putting the cover in place. Only in those situations when the body of the truck is improperly loaded or overloaded or is filled with randomly shaped pieces, one or more of which projects substantially above the side of the truck, will it be necessary for the driver to have to level the load. The common heaping or piling of the load will not present a problem as the cover will pass above the top and will assist in leveling the load in transit. The up, over and down motion also gives the support the necessary clearance above the tailgate so it can operate freely below the support on the rear of the body. A support mounted any lower can interfere with the tailgate so it would have to be moved ahead, over the inside of the truck body where it can easily be damaged by loading equipment.

Figure 4:
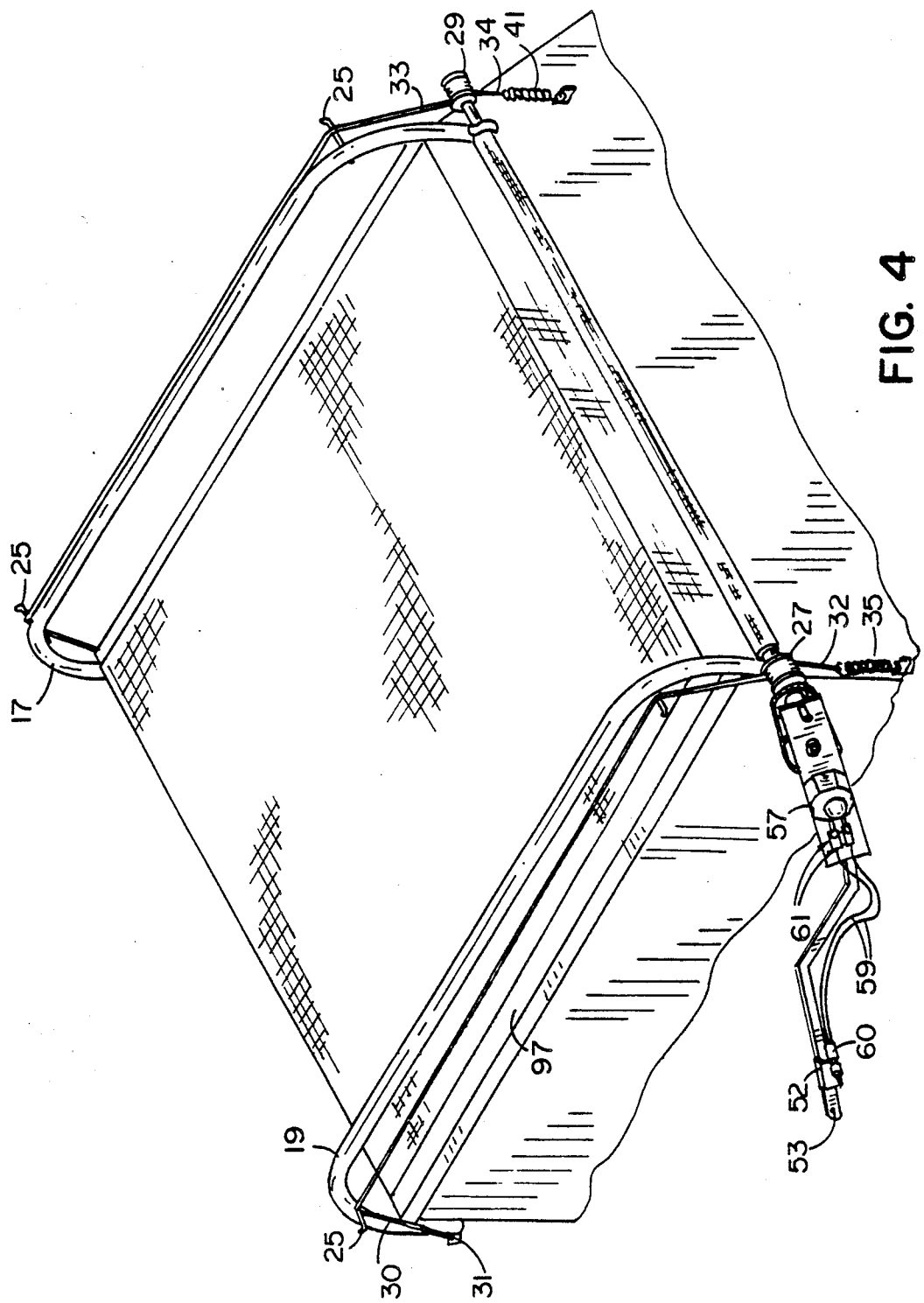
FIG. 4 is a perspective view from the front showing the cover closed.

Referring to FIGS. 3 and 4, the support members 17 and 19 are shown fastened at each end to the sides of the truck 22 and 24. These supports can be bolted or welded to the truck body. In the preferred embodiment, the tubes would be bolted to the sides of the truck so that they can be replaced if severely damaged. The supports are preferably made of tubular steel one to two inches in diameter. The preferred diameter is one and one-eighth inch with a one-eighth inch wall thickness which is strong enough to support the weight of the roller 15 and the cover 10. It is obvious that other than tubular configurations can be used for the supports 17 and 19.

In some applications, it is not necessary to use the frames at the front and rear. For example, in carrying asphalt, the load is very heavy and sits low in the truck body. Also, asphalt can be dumped out without having to substantially raise the tailgate. In some applications, the asphalt is poured out through a chute and the tailgate does not have to be opened. The roller carrying the tarp can then roll side to side along the top front and rear edges of the truck body.

As shown, the supports are shaped in an inverted substantially flattened U configuration having a broad center reach across the body of the truck. Fastened to and projecting from the sides of the supports 17 and 19 are cable guides 25. The cable guides cause the actuating cable to follow the same path as the supports 17 and 19 so that the roller 15 receives a substantially straight pull as it moves up and over each support.

The shape of the frame is in part determined by the height of the sides on the truck and the shape of the usual load. The preferred embodiment is the inverted flattened U. As discussed above, if the load does not project above the sides of the truck no frame is necessary. In situations where the load tends to peak and is emptied from the truck without raising the tailgate, the supports can be smooth curves from one side of the truck to the other with the center of the curve higher than the expected peak of the load.

As shown in FIG. 4, 3-inch diameter cable drums or spools 27 and 29 are fastened to each end of the roller 15. The inner edges of each of the drums preferably contact the supports 17 and 19 and are guided by the supports as the roller 15 passes across the body of the truck. A flexible actuator 30 is fixedly attached to one side of the truck at 31 and extends over the cable guides 25 and is wrapped several times about cable drum 27 before terminating at the edge of the spool where it is attached by a clamp to a drilled hole. Another cable 32 beginning at the opposite edge of the same spool is wound in the opposite direction, comes off the spool, continues across the body, over the guides and terminates at a spring 35 which is attached to a boss 39 projecting from the side of the truck 22. In a similar manner, a flexible actuating means 33 is fastened to the side of the truck, not shown, then wrapped several turns about and fastened to the drum 29. A second cable 34 is wrapped about the drum 29 and then terminated at the spring 41 which is fastened to a boss 43 attached to the side of the truck. The actuating means 31 and 33 are preferably made of steel cable approximately $\frac{1}{8}$ to $\frac{1}{4}$ of an inch in diameter. The actuator means could also be made of wire, rope, or chain.

Figure 5:
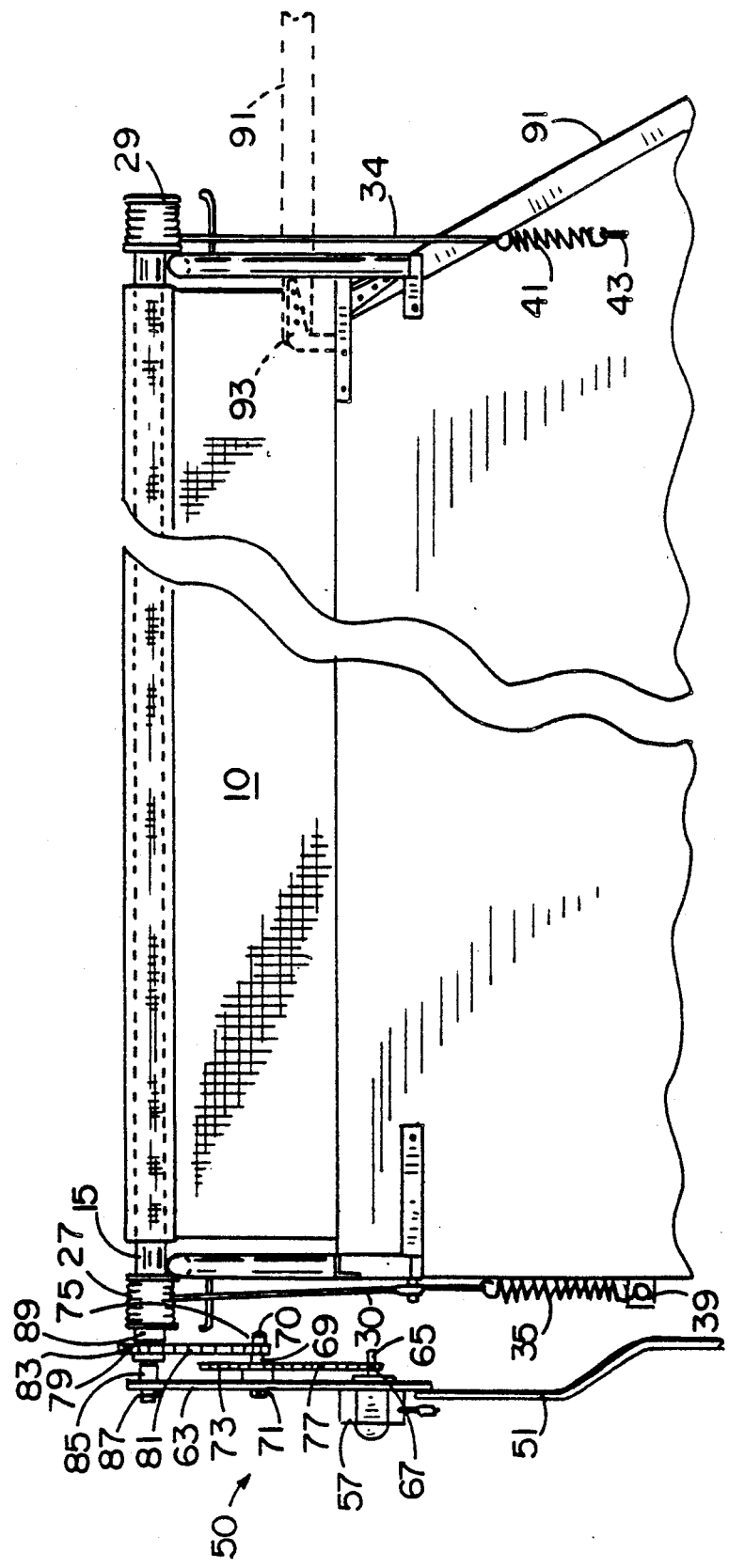
FIG. 5 is a side elevational view similar to FIG. 2; however, the drive mechanism is shown in greater detail.

As shown in FIG. 1, the actuator means are two oppositely wound cables wound on separate drums so that as one cable is wound in as the cover 10 moves, the other is unwound. In FIG. 5, the two cables share a single drum which saves space and is the preferred arrangement. While a single cable can be used, the two cable arrangement is preferred. As the roller 15 is rotated by a driving member, one cable pays out from one end of the drum and the other is wound back at the other end. This gives the roller linear motion to travel across the body. The rotation also unrolls or rolls up the cover as it moves across the body. The important thing to note is that the roller 15 is constantly controlled in the course of its movement, and the timing relationship between linear motion and cover take-up or let-out remains constant. The spring biasing means 35 and 41 keep a strain on the cables and provide flexibility as the drum 15 rises up one vertical side of the supports and drops down the opposite side. While the biasing means are shown as coil springs, it is obvious that any other type of means can be employed which will put a strain on the actuator cable.

As most clearly illustrated in FIGS. 2 and 5, a drive indicated generally by the number 50 is provided for rotating and, thus, moving the cover 10 across the body of the truck. An anti-rotation member 51 is pivotally mounted at the front of the body of the truck in a sleeve 52 which enables the end of member 51 to slide as the roller climbs up over the frame. The sleeve 52 is pivoted at 53 by means of a suitable pin or bolt 55 fastened to the body of the truck. An elongated slot in member 51 can perform the same function. The pivot point 53 is centrally located on the front of the truck body so that the plate 51 can swing from one side of the truck to the other in opening and closing the cover. A motor 57 is carried on the plate 51. The motor can be an electric or fluid-driven motor. In the preferred embodiment, a one and three-quarter horsepower air-driven motor is used. The air pressure for the motor is stored in an air tank and is supplied by the compressor on the truck. As shown in FIG. 4, a pair of similar tubes 59 are used to supply the compressed air to the motor 57. Two tubes are used in order to supply air to drive the motor in either direction to open and close the cover. The flow of air through the tubes is controlled by a pair of valves 60, only one of which is shown. A pair of quick dump valves 61 are provided to release the air pressure or to bleed the high-pressure air from the low pressure side of the system. The valves contain a check valve which allows the high pressure air to pass while it relieves the low pressure air.

The plate which supports the drive motor can be a single shaped piece or, as shown in FIG. 5, can be made of two pieces—a lower portion 51 which is adapted to slide in the sleeve 52 and an upper plate 63 which supports the motor 57 and the gear reduction assembly. The plates 51 and 63 can be joined together by welding or, in the preferred embodiment, the two pieces would be bolted or screwed together so that the motor and drive assembly could be removed for maintenance or replacement while undergoing major repair.

The motor 57 reversibly drives a shaft 65 upon which is mounted a gear 67. A sleeve 69 is mounted on a threaded shaft 70 which is attached to plate 63 by a nut 71 welded to the plate 63. The rotatable sleeve 69 supports a large gear 73 and a small gear 75 welded to gear 73. A drive chain 77 passes over gears 67 and 73 in a chain and sprocket-type arrangement. The gear 75 drives the gear 79 with a similar chain 81. The gear 79 is mounted on a keyed drive shaft 83 which is fitted for rotation in a sleeve 85 which is welded to the plate 63 and kept on by a collar 87. In the preferred embodiment, a one-inch steel drive shaft is welded to a suitable size bushing and slid into and welded to the two-inch roller 15. The chain and sprocket double reduction drive shown provides a 15:1 gear ratio. A gear ratio up to 30:1 is acceptable. The lower the gear ratio, the faster the cover moves. The preferred ratio is 23:1 which moves the cover quickly without subjecting it to undue stress. This provides ample drive for the roller 15 to move the cover 10 back and forth across the body of the truck. The chain and sprocket-type drive shown can be replaced by a direct gear drive or by a combined gear and shaft combination to provide the torque necessary to rotate the cover roller 15. The roller 15 can also be driven directly by a motor; however, in order to reduce the size of the components and the weight carried by the plate 51 or the combination 51 and 63, it is preferred to use a smaller drive motor with a suitable reduction combination to provide the driving force. Using the combination illustrated and described in FIG. 5, it has been found that the truck body can be covered or uncovered in approximately three seconds. The motor 57 can be controlled by the driver of the truck while standing on the ground from suitable control boxes 90 and 92, FIG. 2, mounted on the side of the truck body. The tubing for each control box is not shown. The control 90 enables the driver to uncover the load when the dump body is in a raised position.

When the cover 10 is rolled up to uncover the truck body, the roller 15 and cover 10 rest in hooks 21, referring to FIG. 3, along the side of the truck body 22. The cover is supported at a point below the top edge of the truck body to protect the cover from damage by loading equipment. With the cover 10 either rolled up or unrolled, the body can be pivoted upwardly in the customary fashion to allow the load to pass out of the rear through the tailgate 91. The tailgate 91 is supported at each upper corner by hangers 93 and 95. As shown in FIGS. 3 and 5, when the tailgate 91 is in its raised position, there is ample room under support 19 for the hangers 93 and 95 to rise to fully open the rear of the dump body without the tailgate hitting the support. The supports 17 and 19 are preferably mounted so that the horizontal portion is approximately one foot above the top edge of the truck body. When the cover is put in place over the load, the roller 15 rides along supports 17 and 19 and is guided by the inner edges of the cable drums 27 and 29. While the roller passes up and over the supports, the cover will unwind from the roller without being stressed and will pass smoothly over the load. As shown in FIG. 4, the cover fits snugly and tightly down upon both side edges of the body. A wind deflector 97 is placed across the front of the truck body to prevent wind from getting under the leading edge of the cover. The wind deflector 97 can be a vertical board or piece of sheet stock, for example, a 2-by-6 inch board or a 4-inch metal deflector fastened to the front support with the lower edge preferably in contact with the top of the truck body to block the wind.

Figure 7:
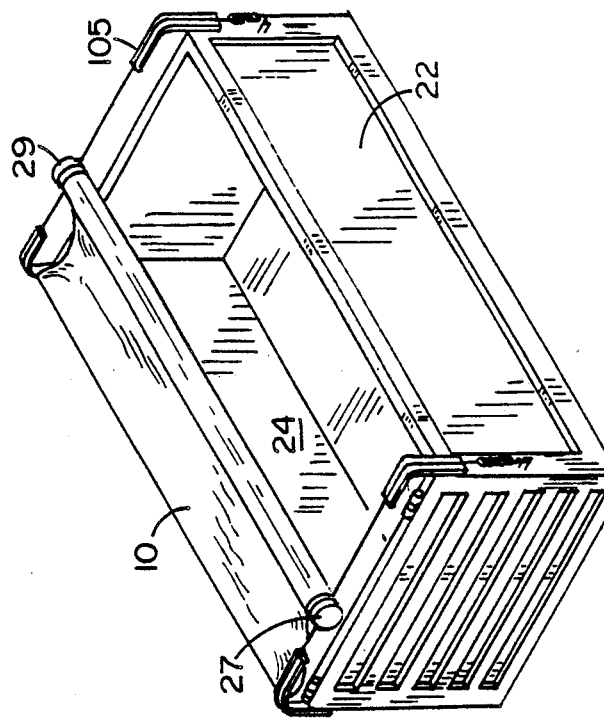
FIG. 7 is a perspective view showing the cover for the truck supported at each end by the driving cable.
Figure 6:
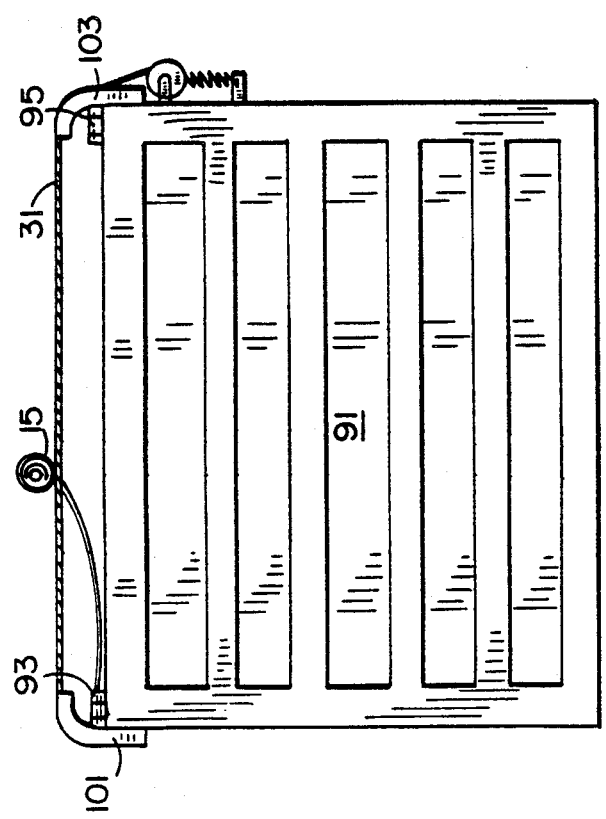
FIG. 6 is an end elevational view of an open dump body showing the cover supported by the driving cable.

In another embodiment of the invention and th3 preferred mode, referring to Figs. 6 and 7, the cover 10 and the roll 15 are supported by the flexible actuator 31 rather than by a rigid metal frame. This embodiment has been found particularly useful in carrying loads such as large masses of clay which have a tendency to agglomerate and adhere to the body of the truck. Clay often has a tendency to stick within the body of the truck until the truck is raised at a precarious angle and rocked back and forth to set the load free. The clay often comes loose in a large mass which can strike and damage the supporting frame. In the embodiment shown in FIGS. 6 and 7, if this same situation occurred, the clay would merely strike the cable and do no damage to the unloading mechanism.

As shown in FIGS. 6 and 7, the flexible actuator is raised above the tailgate hangers 93 and 95 by a pair of short curve metal frames 101 and 103 which are fastened to the sides of the truck 22 and 24 by suitable fastening means such as bolts, screws, or even welding. It is preferred to use bolts and mating nuts to hold the pieces 101 and 103 in place so that they can be removed from the truck in the event of damage. Each of the frames 101 and 103 is made of flat steel stock and provides a smooth curved surface for the actuator 31 to slide upon. The pieces 101 and 103 are positioned on the truck body so that the center span of the actuator or driving member 31 is approximately 8 to 10 inches above the top of the tailgate. This height provides ample room for the tailgate 91 to fully open on its hangers 93 and 95. At the front of the truck body, a piece of flat steel stock 105 is shaped into a flattened "U" configuration and attached to the sides of the truck near the upper edges of the open body. The flat steel stock provides a cable guiding surface so that the previous cable supports which projected from the side of the frame are no longer necessary. In the embodiment of FIGS. 6 and 7, the cable is guided smoothly across the flattened surface which also acts as a guide for the cable drums 27 and 29. The embodiment shown in FIGS. 6 and 7 substantially simplifies the frame for the cover moving mechanism while at the same time removing a portion of the frame at the rear of the truck and protecting the overall uncovering mechanism from damage.

It can be seen from the prior description that the power-driven cover of the present invention enables the driver of the truck to cover or uncover the load in approximately three seconds while standing safely on the ground. Since the supports carry the cover up and over the load, there is no reason for the driver to risk injury climbing in and out of the truck body to level the load. It also offers a weather-tight sealed covering for the load and the side to side action stands up well to high wind speeds.

Though the invention has been described with respect to a specific preferred embodiment thereof, many variations and modifications will become apparent to those skilled in the art. It is therefore the intention that the appended claims will be interpreted as broadly as possible in view of the prior art to include all such variations and modifications.

The embodiments of the invention in which an exclusive property or privilege is claimed are defined as follows.

1. A power driven cover for an open load carrying body comprising:
   a cover for confining a load in an open body;
   a roller for gathering said cover as it uncovers said open body;
   a pair of supports, one at each end of said open body for supporting said roller as said roller moves from one side of said truck to the other side;
   a driving means for moving said roller;
   a flexible actuating and guide member extending from one side of said body to the other side for controlling the movement of said roller;
   a motor for driving said driven means; and
   a control for said motor.

2. A power-driven cover for an open load-carrying body as set forth in claim 1 wherein each support of said pair of supports is made of steel in an inverted flattened U configuration.

3. A power-driven cover for an open load-carrying body as set forth in claim 1 wherein said driving means is a gear reduction drive.

4. A power-driven cover for an open load-carrying body as set forth in claim 1 wherein said driving means is a double chain sprocket gear reduction drive.

5. A power-driven cover for an open load-carrying body as set forth in claim 1 wherein said motor is a fluid-actuated motor.

6. A power-driven cover for an open load-carrying body as set forth in claim 1 wherein said motor is an air-driven motor.

7. A power-driven cover for an open load-carrying body as set forth in claim 1 wherein said motor is an electric motor.

8. A power driven cover for a dump truck body comprising:
   a front frame member extending upwardly from and across the front of said body;
   a rear frame member extending upwardly from and across the rear of said body;
   a roller supported by said front and rear frame members;
   a cover for said truck body secured along one side of said truck body and wrapped about said roller;
   a cable drum at each end of said roller;
   a driving means for rotating said roller;
   a pair of cables for each of said drums extending from one side of said truck body to and about said drum and terminating at a bias means between said cable ends and the other side of said truck body;
   a motor for actuating said driving means; and
   a control for said motor.

9. A power driven cover for an end dump open truck body having a tailgate supported by hangers comprising:
   cover means for covering said open truck body;
   roller means for holding said cover means;
   support means at the front end of said open truck body for supporting one end of said roller means;
   driven means for supporting one end of said roller means above said tailgate hangers and for causing said roller means and cover means to move from a first position at one side of said truck body where said open truck body is covered to a second position at the other side of said truck body where said open truck body is uncovered and back to the first position;
   a positive drive means for said driven means; and
   a control means for said drive means.

10. A power-driven cover for an open load-carrying body as set forth in claim 9 wherein said support means at the front end of said open truck body is made of steel stock in an inverted flattened U configuration.

11. A power-driven cover for an open load-carrying body as set forth in claim 9 wherein said driven means is a steel cable.

12. A power-driven cover for an open load-carrying body as set forth in claim 9 wherein said driven means is guided up and over the rear of said open truck body by a pair of spaced curved metal frames.

13. A power-driven cover for an open load-carrying body as set forth in claim 9 wherein said motor is a fluid-actuated motor.

14. A power-driven cover for an open load-carrying body as set forth in claim 9 wherein said motor is an air-driven motor.

15. A power driven cover for an open truck body comprising:
   a roller for a tarpaulin supported by the front and rear top edges of said dump truck body and adapted to move from one side of said dump truck body to the other;
   a tarpaulin for covering said dump truck body having one edge fixed along an edge of said dump truck body and with the opposite edge disposed on said roller;
   a spool on each end of said roller;
   a pair of oppositely wound flexible actuators on each of said spools;
   one actuator of each of said pairs of actuators having one end fixed to said truck body and the other end fixed to said spool;
   a biasing member between the end of each of the other actuators of said pairs of flexible actuators and said truck body;
   a drive for causing said roller to roll up said tarpaulin as said roller is driven in a first direction across said truck body and for unrolling said tarpaulin as said roller is driven in a second direction across said truck body;
   a motor for actuating said drive;
   a support for said motor and said drive, said support having one end pivotally mounted on said truck body while the other end is free to move with said drive; and
   a control for said motor.

* * * * *